United States Patent [19]

Bluvstein

[11] Patent Number: 4,641,722
[45] Date of Patent: Feb. 10, 1987

[54] CONTROL CIRCUIT TO INHIBIT HARMFUL TRANSMISSION SHIFTING

[76] Inventor: Dale C. Bluvstein, North 104, West 20670 Willow Creek Rd., Colgate, Wis. 53017

[21] Appl. No.: 775,499
[22] Filed: Sep. 12, 1985
[51] Int. Cl.$^4$ ............................................. B60K 20/02
[52] U.S. Cl. ................................. 180/271; 192/0.033
[58] Field of Search ................. 180/271; 123/198 D, 123/198 DC, 179 A; 182/0.033

[56] References Cited

U.S. PATENT DOCUMENTS

| | | |
|---|---|---|
| 2,960,174 | 11/1960 | Walker . |
| 3,028,926 | 4/1962 | Spicer, Jr. . |
| 3,250,142 | 5/1966 | Schuster et al. . |
| 3,913,700 | 10/1975 | James . |
| 4,172,980 | 10/1979 | Hsieh et al. .................. 180/271 |
| 4,267,804 | 5/1981 | Rypka ............................ 180/271 |
| 4,300,652f | 11/1981 | Redzinski et al. ............. 180/271 |
| 4,371,051 | 2/1983 | Achterholt ..................... 180/271 |
| 4,414,937 | 11/1983 | Veda et al. ..................... 123/198 D |

Primary Examiner—John J. Love
Assistant Examiner—Ross Weaver
Attorney, Agent, or Firm—Michael, Best & Friedrich

[57] ABSTRACT

Disclosed herein is a control circuit for regulating the ignition power of a vehicle to inhibit direction changing shifting of the vehicle transmission while the vehicle is in motion. The control circuit includes a motion sensing circuit for generating a vehicle motion signal when the vehicle is in motion, a transmission sensing circuit for generating a transmission neutral signal when the vehicle transmission is in neutral, and an ignition circuit control connected to the motion sensing circuit and the transmission sensing circuit for receiving the vehicle motion signal and the transmission neutral signal, and which is operable for interrupting the vehicle engine ignition power for a predetermined period of time when an operator shifts the transmission into nuetral while the vehicle is in motion.

21 Claims, 4 Drawing Figures

CONTROL CIRCUIT TO INHIBIT HARMFUL TRANSMISSION SHIFTING

BACKGROUND OF INVENTION

The invention relates to mobile industrial vehicles, for example, forklifts, which utilize an automatic transmission which is often shifted by an operator from the forward mode to the reverse mode and vice-versa. More particularly, it relates to devices which attempt to prevent damage to the transmission if it is shifted to change vehicle direction while the vehicle is in motion.

Attention is directed to the prior devices disclosed in U.S. Pat. No. 3,250,142, issued May 10, 1966; U.S. Pat. No. 3,913,700, issued Oct. 21, 1975; U.S. Pat No. 2,960,174, issued Nov. 15, 1960; and U.S. Pat. No. 3,028,926, issued Apr. 10, 1962.

The invention is concerned with this general area and has among its general objects to prevent damage to an automatic transmission by providing for automatic shut off of the ignition power to the engine of a moving vehicle for a specified time delay when the vehicle transmission is shifted between forward and reverse, or vice versa, while the vehicle is in motion.

Accordingly, it is the object of this invention to provide a control circuit for deterring the operator from shifting the transmission to change vehicle direction while the vehicle is in motion.

It is a further object of this invention to provide a control circuit of a type hereinafter outlined, including electrically actuated means for interrupting the vehicle ignition power, controlled by a motion sensing device connected to a rotating part of the vehicle, and by a transmission sensing device connected to an already existing transmission neutral safety switch connected to the gear shift lever.

It is also an object of this invention to prolong the transmission system of the vehicle by preventing wear and tear on the transmission by interrupting the ignition power to the vehicle when it is shifted through the neutral position to change direction while the vehicle is still in motion.

SUMMARY OF THE INVENTION

In order to achieve the foregoing and other objects, the invention provides a circuit for controlling the current supplied from the ignition switch to the ignition coil, which controls the power to the engine. In order to keep the vehicle engine running the vehicle must be stopped before the transmission can shift to change direction. The ignition power to the vehicle engine will automatically shut off for a predetermined period of time when a motion sensing circuit detects motion and the transmission sensing circuit detects that the transmission is in neutral prior to going into forward or reverse gear. This is the only situation where the control circuit will cause the vehicle engine to be shut off.

According to a preferred embodiment the invention provides a control circuit for regulating the ignition power of a vehicle to inhibit direction changing shifting of the vehicle transmission while the vehicle is in motion. The control circuit includes motion sensing circuit means for generating a vehicle motion signal when the vehicle is in motion, transmission sensing circuit means for generating a transmission neutral signal when the vehicle transmission is in neutral, and ignition circuit control means connected to the motion sensing circuit means and the transmission sensing circuit means for receiving the vehicle motion signal and the transmission neutral signal, and operable for interrupting the vehicle engine ignition power when an operator shifts the transmission into neutral while the vehicle is in motion. Preferably the ignition control circuit means interrupts the vehicle ignition power for a predetermined period of time, and includes indicator means or an indicator light for indicating to the vehicle operator when the ignition power has been interrupted by the control circuit.

In one embodiment of the invention, the motion sensing circuit means includes motion detecting means for sensing movement of a portion of the vehicle which moves when the vehicle is in motion, and which generates a motion input signal, the motion sensing circuit also including motion signal processing means for receiving said motion input signal and for generating the vehicle motion signal when the vehicle is in motion. Preferably, the motion detecting means includes an idler wheel adapted to bear against and rotate with a vehicle tire.

Generally, a vehicle such as a fork lift will include a transmission neutral safety switch that is closed and connected to ground for allowing energizing of the starter solenoid, only when the transmission is in neutral. In one embodiment of the invention, the transmission sensing circuit means includes an input line connected to the transmission neutral safety switch so the input line is connected to ground when the vehicle transmission is in neutral, the transmission sensing circuit means also including ground signal processing means coupled to the input line and operable to generate the transmission neutral signal when the vehicle transmission is in neutral.

In one embodiment of the invention, the ignition circuit control means includes digital logic circuit means, preferably a NAND gate, having inputs for receiving the vehicle motion signal and the transmission neutral signal, and also includes switch means operable for interrupting the vehicle ignition power. The ignition circuit control means also includes timer means operable in conjunction with the digital logic circuit means and the switch means for interrupting vehicle power for a predetermined period of time when an operator shifts the transmission into neutral while the vehicle is in motion. Preferably, the switch means comprises a transistor and also comprises relay means, which when energized, connects the vehicle ignition coil to the ignition switch, and when de-energized, disconnects the vehicle ignition coil from the ignition switch, thereby interrupting the vehicle ignition power. The relay means is connected to the transistor so that the relay is de-energized when the transistor is rendered nonconductive, which occurs when an operator shifts the transmission into neutral while the vehicle is in motion.

When the vehicle is stationary the control circuit will allow the ignition coil to receive power. The vehicle may be shifted through the neutral position when the vehicle is stationary without shutting the vehicle off. The control circuit will also allow the vehicle to be in motion, with an operable ignition, only when the gear shift is in the forward or reverse gears. If the vehicle is in motion and the transmission sensing circuit means detects a neutral position on the gear shift lever, the control circuit will shut off the current supply to the ignition coil and force the vehicle engine to be shut off by disconnecting the power to the ignition coil for a specified time delay. Generally, this will require the operator to stop the vehicle before he can restart it and shift into gear. Thus an operator will learn that it is quicker to stop the vehicle before shifting the transmission to change direction, and this defers harmful shifting of the transmission while the vehicle is still in motion.

This and other objectives and features of the invention will become further known by reference to the following description of the preferred embodiment.

BRIEF DESCRIPTION OF DRAWINGS

FIG. 4 is a schematic diagram of the power supply contained in the control circuit shown in FIG. 1.

DESCRIPTION OF THE PREFERRED EMBODIMENT

Figure 1:
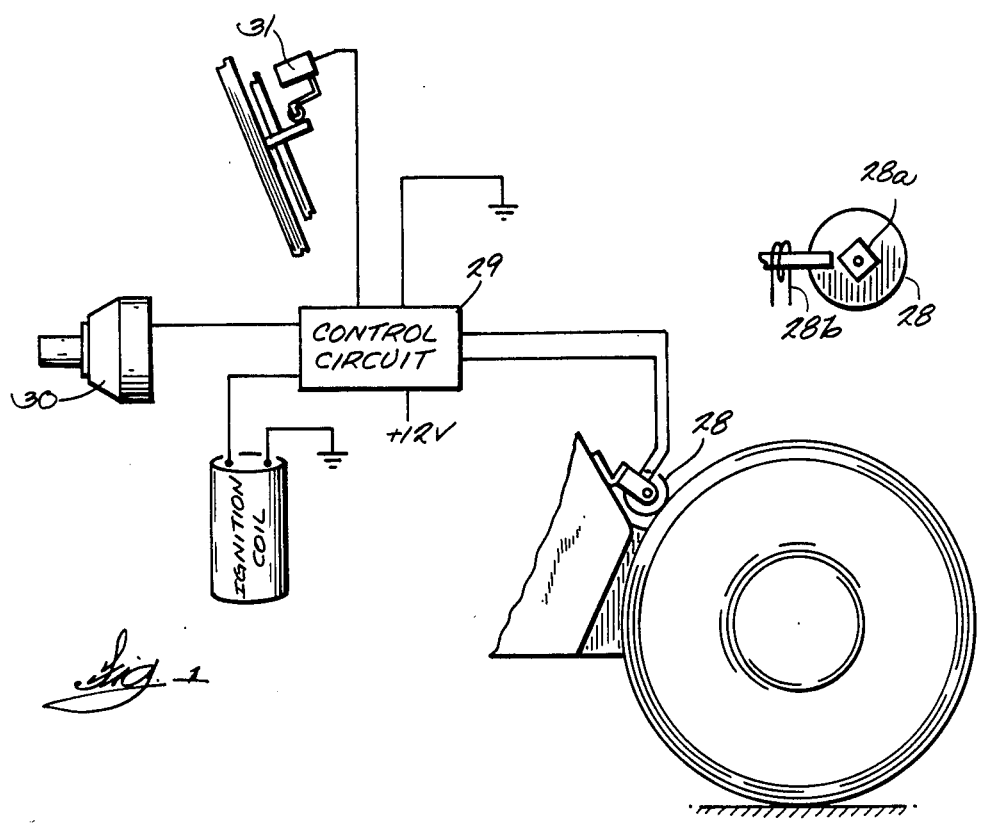
FIG. 1 is a diagramatic view of the overall control circuit which embodies various of the features of the invention.

Shown diagrammatically in FIG. 1 is a general configuration of a control circuit which senses the position of the transmission and the movement of a vehicle (partially shown). The invention includes a control circuit 29 connected to an ignition switch 30 and which receives inputs from the OEM installed transmission neutral safety switch 31, and the motion detecting means including an idler wheel 28.

The general function of the control circuit 29 is to prevent direction changing shifting of a vehicle, while the vehicle is in motion. This will be achieved by processing two separate inputs, one from a motion detecting device, and the other from the already existing transmission neutral safety switch 31, connected to the vehicle shift linkage (partially shown) indicating whether the transmission is engaged or in a neutral position.

Figure 2:
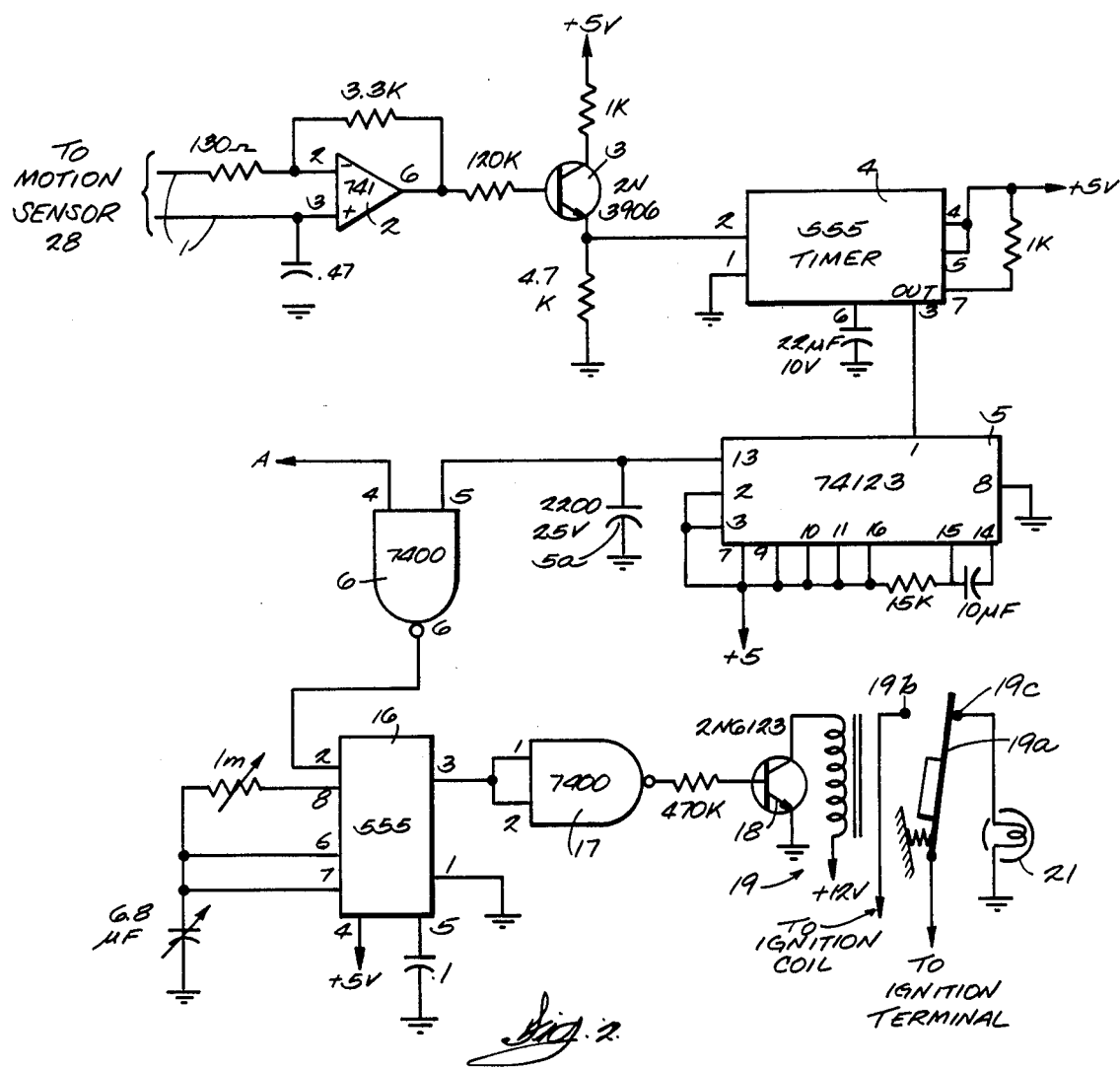
FIG. 2 is a schematic diagram of the motion sensing circuit and ignition circuit control contained in the control circuit shown in FIG. 1.
Figure 3:
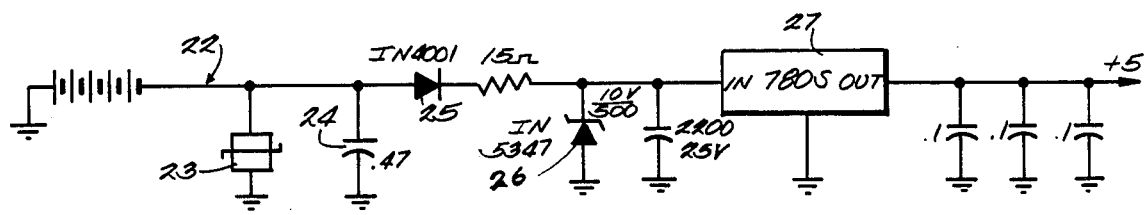

The major elements which make up the control circuit 29 will be introduced in the context of further description of operation of the control circuit. The motion detecting device preferably includes an idler wheel 28, and it may ride or bear against any part of the vehicle, such as a tire, which rotates while the vehicle is in motion. While various arrangements could be utilized, the device 28 preferably incudes a cam 28a which passes in front of a magnetic coil 28b when the vehicle is in motion. As this occurs, varying magnetic flux induces a voltage in the magnet wound coil, which voltage appears at inputs labelled 1 in FIG. 2.

From there, the voltage goes to motion signal processing means, including the operational amplifier, generally designated 2, which amplifies the signal to 1.5 to 4 volts. The signal is then inverted and the voltage range is shifted to 0-3 volts, at transistor 3. The low signal then goes into the timer, generally designated 4, which cleans the signal, and amplifies its range to 0-5 volts. The timer 4 then outputs a pulse of predetermined width into a monostable multivibrator generally designated 5. The multivibrator 5 detects when the pulse exists, and when it does not. The output of the multivibrator 5 is a high when the timer 4 outputs a high signal, and charges capacitor 5a, representing the vehicle in motion. The multivibrator 5 output is low when the timer 4 has a low output, occuring when the vehicle is stationary. The foregoing components are included in a portion of the control circuit which generally comprises motion sensing circuit means. This signal from multivibrator 5 is received by the balance of the circuitry shown in FIG. 2, which generally comprises ignition circuit control means and includes a logical NAND gate 6. Gate 6 also receives an input from the transmission sensing circuit means shown in FIG. 3.

Figure 3:
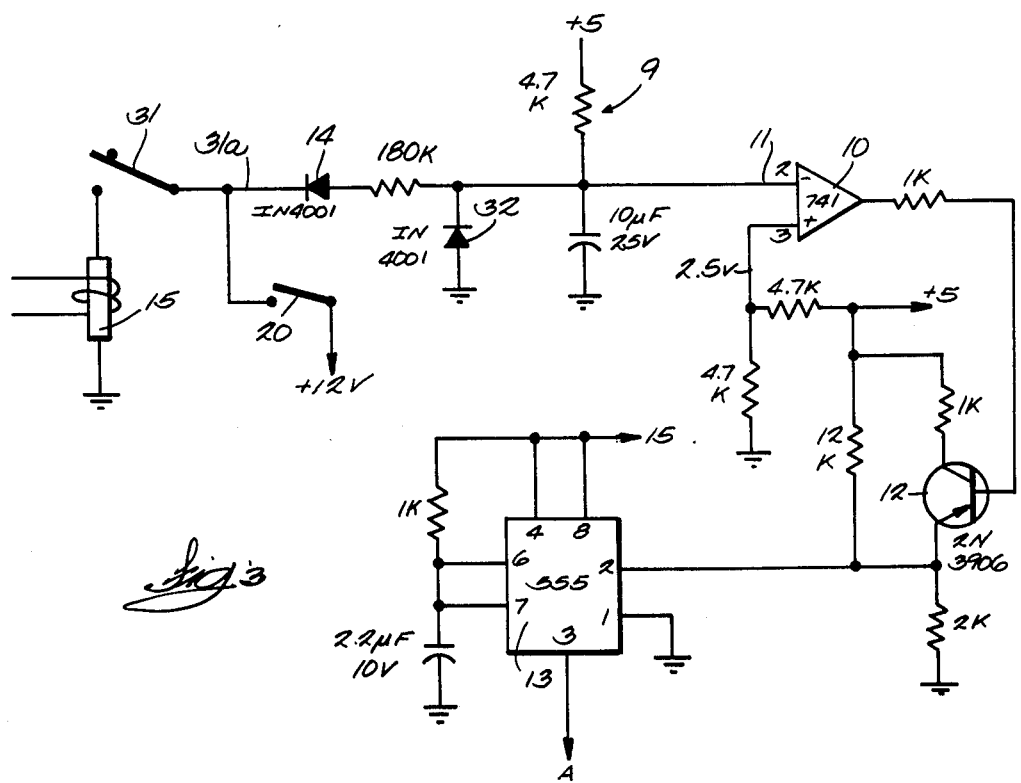
FIG. 3 is a schematic diagram of the transmission sensing circuit contained in the control circuit shown in FIG. 1.

The circuit in FIG. 3 is designed to detect whether the vehicle transmission is in neutral, or in gear. This is done by ground signal processing means which monitors the transmission neutral safety switch 31 shown on the left side of FIG. 3. More particularly, FIG. 3 illustrates an input line 31a connected to the vehicle ignition switch 20 which is closed by the ignition key (not shown). When the key is in the start position, a signal of 12 volts is allowed to pass through closed switch 20 and into the common of switch 31. It is also sent to the input line 31a. The 12 volt signal is blocked by the reverse diode 14, shown in FIG. 3. This is done to eliminate the 12 volt pulse which starts the engine from being transmitted through the transmission sensing circuit.

If the transmission is in neutral, the safety switch 31 will be closed allowing the 12 volts to energize the vehicle starter solenoid 15 to start the vehicle engine (not shown), which may be a convention internal combustion engine. When the key is in its normal open (run) position, switch 20 is open and cuts off the 12 volt signal. If the vehicle remains in neutral, switch 31 will remain closed and a 5 volt input from the pull up resistor, generally designated 9, will be clamped to ground through the switch 31 and the starter solenoid 15. This will allow the potential at the inverting input of the comparator 10 to be 0. The comparator 10 will then compare this input with a 2½ volt reference input at the non-inverting input of the comparator. Since the non-inverting input is greater than the inverting input, the output of the comparator 10 will then be a high signal, which is connected to the base of the transistor 12. This will force the transistor 12 to be nonactive, thus producing a low input signal conveyed to the timer 13.

When the vehicle switches out of neutral, the switch 31 will open and the 5 volt signal from the pull up resistor 9 will no longer be clamped to ground but will produce a high voltage (5 volts) signal at the comparator inverting input. The inverting input of the comparator 10 will then be greater than the non-inverting input thus producing a low signal from the comparator into the base of the transistor 12. This will allow the transistor 12 to be active and produce a high signal conveyed to the timer, 13, which outputs a low signal on line A. The 5 volt signal from the pull up resistor 9 is compared with a 2½ volt reference signal to the comparator 10 as a dampening effect, or as an elimination of any false signals from the safety switch 31 which may be produced by bouncing of the switch. The timer 13 must be triggered by a low signal in order to output a high signal on line A, indicating that the transmission is in neutral.

Referring back to FIG. 2, the NAND gate 6 output will always be high unless the two inputs, from line A and multivibrator 5, are both high, which can only be achieved when the vehicle is sensed to be in motion and in neutral. If the output of the NAND gate 6 is low, which occurs when the vehicle is in neutral and moving, then the timer 16 receives a low signal from NAND gate 6 and outputs a timed, seven second high signal, and the second NAND gate 17 functions as an inverter and inverts the signal to low, causing switch means or the transistor 18 to turn off, therefore not allowing the coil of relay 19 to conduct. If the coil of relay 19 does not conduct, then the contact 19a is biased out of contact with terminal 19b and into contact with terminal 19c. Since contact 19a is connected to the 12-volts of the ignition switch (when in a run position) and terminal 19b is connected to the ignition coil, the vehicle engine ignition power will be interrupted for a predetermined period of time (for example, seven seconds) until the timer 16 times out. The predetermined period of time can be adjusted, to adjust the deterrent effect of the control circuit on an operator to reduce harmful transmission shifting, by using an adjustable resistor or capacitor connected to timer 16, as diagramatically shown in FIG. 2. Also indicator means or light 21 will be energized for indicating to the vehicle operator that the ignition power has been interrupted by the control circuit.

If the output of the NAND gate 6 is high, the timer 16 is not triggered and continues to output a normal low signal. This signal in turn is inverted by the NAND gate 17 and is inputed to the base of the transistor 18 as a high analog signal. The transistor 18 is then forward biased, and will conduct to energize the relay 19 allowing the engine to remain running. The common, and normally open contacts 19a and 19b are used to connect the 12 volt ignition current. When the relay 19 is de-energized, the 12 volts to ignition is disabled and the engine is shut down.

The power to the circuit comes from the 12 volt battery of the vehicle. It is then inputed to the circuit as shown in FIG. 4. From here, the 12 volts is clamped with a varistor 23. Zener diode 26 brings the voltage level down to approximately 10 volts. The voltage is then filtered by a capacitor 24 to filter any variations that might occur. The diode 25 is designed to protect the circuit from reverse polarity. If the battery were to be improperly connected, the diode 25 would not conduct and therefore, it protects the circuitry.

The zener diode 26 is in place to make sure no more than 10 volts is admitted to the voltage regulator 27. The voltage regulator 27 regulates the voltage to a steady 5 volt output which is then used in the system to power the circuitry.

In the above description, some of the connections to the NAND gates and several of the electrical components were not specifically described as shown or labeled. Their functions should be apparent to one skilled in the art in the context of the description of the control circuit and its operation.

It is to be understood that the invention is not confined to the particular construction and arrangement of components illustrated, but embraces all such modified forms as come within the scope of the following claims.

I claim:

1. A control circuit for regulating the ignition power of a vehicle to inhibit direction changing shifting of the vehicle transmission while the vehicle is in motion, comprising motion sensing circuit means for generating a vehicle motion signal when the vehicle is in motion, transmission sensing circuit means for generating a transmission neutral signal when the vehicle transmission is in neutral, and ignition circuit control means connected to said motion sensing circuit means and said transmission sensing circuit means for receiving said vehicle motion signal and said transmission neutral signal, and operable for interrupting the vehicle engine ignition power when an operator shifts the transmission into neutral while the vehicle is in motion.

2. A control circuit in accordance with claim 1 wherein said ignition control circuit means interrupts the vehicle ignition power for a predetermined period of time.

3. A control circuit in accordance with claim 1 wherein said ignition circuit control means includes indicator means for indicating to the vehicle operator when the ignition power has been interrupted by said control circuit.

4. A control circuit in accordance with claim 1 wherein said motion sensing circuit means includes motion detecting means for sensing movement of a portion of the vehicle which moves when the vehicle is in motion, and which generates a motion input signal, said motion sensing circuit also including motion signal processing means for receiving said motion input signal and for generating said vehicle motion signal when the vehicle is in motion.

5. A control circuit in accordance with claim 4 wherein said motion signal processing means includes amplifier means, timer means, and monostable multivibrator means coupled together for processing said motion input signal to generate said vehicle motion signal.

6. A control circuit in accordance with claim 4 wherein said motion detecting means includes a rotatable member adapted to be installed on the vehicle so that said member rotates in response to a portion of the vehicle which rotates when the vehicle is in motion and which generates said motion input signal.

7. A control circuit in accordance with claim 6 wherein said rotatable member includes an idler wheel adapted to bear against and rotate with a vehicle tire.

8. A control circuit in accordance with claim 1 wherein the vehicle includes a transmission neutral safety switch that is closed and connected to ground for allowing energizing of the vehicle engine starter solenoid, only when the transmission is in neutral, and wherein said transmission sensing circuit means includes an input line connected to the transmission neutral safety switch so the said input line is connected to ground when the vehicle transmission is in neutral, said transmission sensing circuit means also including ground signal processing means coupled to said input line and operable to generate said transmission neutral signal when the vehicle transmission is in neutral.

9. A control circuit in accordance with claim 8 wherein said ground signal processing means includes pull up resistor means coupled to said input line, and comparator means and timer means coupled together for generating said transmission neutral signal when the vehicle transmission is in neutral.

10. A control circuit in accordance with claim 1 wherein said ignition circuit control means includes digital logic circuit means having inputs for receiving said vehicle motion signal and said transmission neutral signal, and also includes switch means operable for interrupting the vehicle ignition power when an operator shifts the transmission into neutral while the vehicle is in motion.

11. A control circuit in accordance with claim 10 wherein said ignition circuit control means also includes timer means operable in connection with said digital logic circuit means and said switch means for interrupting vehicle ignition power for a predetermined period of time when an operator shifts the transmission into neutral while the vehicle is in motion.

12. A control circuit in accordance with claim 10 wherein said digital logic circuit means includes a NAND gate having inputs for receiving said vehicle motion signal and transmission neutral signal.

13. A control circuit in accordance with claim 12 wherein said switch means comprises a transistor which is rendered non-conductive to interrupt vehicle ignition power when an operator shifts the transmission into neutral while the vehicle is in motion.

14. A control circuit in accordance with claim 13 wherein said switch means also comprises relay means, which when energized, connects the vehicle ignition coil to the vehicle ignition switch, and when de-energized, disconnects the vehicle ignition coil from the ignition switch, thereby interrupting the vehicle ignition power, said relay means being connected to said transistor so that said relay means is de-energized when said transistor is rendered non-conductive.

15. A control circuit in accordance with claim 14, wherein said ignition circuit control means further includes an indicator light, and wherein said relay means, when de-energized, connects said light to the vehicle ignition switch for lighting and indicating to the vehicle operator that the ignition power has been interrupted by said control circuit.

16. A control circuit for regulating the ignition power of a vehicle to inhibit direction changing shifting of the vehicle transmission while the vehicle is in motion, the vehicle including a transmission neutral safety switch that is closed and connected to ground for allowing energizing of the vehicle engine starter solenoid, only when the transmission is in neutral, said control circuit comprising motion sensing circuit means for generating a vehicle motion signal when the vehicle is in motion, transmission sensing circuit means including an input line connected to the transmission neutral safety switch so the said input line is connected to ground when the vehicle transmission is in neutral, and also including ground signal processing means coupled to said input line and operable to generate a transmission neutral signal when the vehicle transmission is in neutral, and ignition circuit control means including digital logic circuit means having inputs for receiving said vehicle motion signal and said transmission neutral signal, switch means and timer means operable in connection with said digital logic circuit means and said switch means for interrupting vehicle ignition power for a predetermined period of time when an operator shifts the transmission into neutral while the vehicle is in motion.

17. A control circuit in accordance with claim 16 wherein said ground signal processing means includes pull up resistor means coupled to said input line, and comparator means, and timer means coupled together for generating said transmission neutral signal when the vehicle transmission is in neutral.

18. A control circuit in accordance with claim 16 wherein said timer means is adjustable to vary said predetermined period of time during which the vehicle ignition is interrupted when an operator shifts the transmission into neutral while the vehicle is in motion.

19. A control circuit in accordance with claim 16 wherein said digital logic circuit means includes a NAND gate having inputs for receiving said vehicle motion signal and said transmission neutral signal, and wherein said switch means comprises a transistor which is rendered non-conductive to interrupt vehicle ignition power when an operator shifts the transmission into neutral while the vehicle is in motion.

20. A control circuit in accordance with claim 19 wherein said switch means also comprises relay means, which when energized, connects the vehicle ignition coil to the vehicle ignition switch, and when de-energized, disconnects the vehicle ignition coil from the ignition switch, thereby interrupting the vehicle ignition power, said relay means being connected to said transistor so that said relay means is de-energized when said transistor is rendered non-conductive.

21. A control circuit in accordance with claim 20 wherein said ignition circuit control means further includes an indicator light, and wherein said relay means, when de-energized, connects said light to the vehicle ignition switch for lighting and indicating to the vehicle operator that the ignition power has been interrupted by said control circuit.

* * * * *